United States Patent [19]

Drs et al.

[11] Patent Number: 5,494,516
[45] Date of Patent: Feb. 27, 1996

[54] WORKABLE CEMENTITIOUS COMPOSITIONS

[75] Inventors: Josef F. Drs, Vienna, Austria; Tom Melbye, Zurich, Switzerland; Odd M. Tjugum, Dal, Norway; Salvatore Valenti, Binningen, Switzerland

[73] Assignee: Sandoz Ltd., Basel, Switzerland

[21] Appl. No.: 95,125

[22] Filed: Jul. 20, 1993

[30] Foreign Application Priority Data

Jul. 22, 1992 [GB] United Kingdom ............... 9215600
Dec. 18, 1992 [GB] United Kingdom ............... 9226411

[51] Int. Cl.$^6$ .................................................. C04B 24/00
[52] U.S. Cl. ................... 106/819; 106/802; 106/808; 106/809; 106/810; 106/822; 106/823; 427/397.7; 427/427
[58] Field of Search .................... 106/802, 804, 106/810, 819, 822, 823, 808, 809; 427/397.7, 427

[56] References Cited

U.S. PATENT DOCUMENTS

| | | | |
|---|---|---|---|
| 4,746,367 | 5/1988 | Meyer | 106/823 |
| 5,085,708 | 2/1992 | Moriya et al. | 106/802 |
| 5,176,753 | 1/1993 | Brook | 106/823 |
| 5,203,919 | 4/1993 | Bobrowski et al. | 106/823 |
| 5,223,036 | 6/1993 | Koxata et al. | 106/823 |

FOREIGN PATENT DOCUMENTS

| | | |
|---|---|---|
| 0072138 | 2/1983 | European Pat. Off. . |
| 0208535 | 1/1987 | European Pat. Off. . |
| 58-161953 | 9/1983 | Japan . |
| 59-109662 | 6/1984 | Japan . |
| 1507661 | 4/1978 | United Kingdom . |
| 1596212 | 8/1981 | United Kingdom . |
| 2164930 | 4/1986 | United Kingdom . |
| 2221673 | 2/1990 | United Kingdom . |
| WO91/17127A1 | 11/1991 | WIPO . |
| WO92/11982A1 | 7/1992 | WIPO . |

OTHER PUBLICATIONS

Patent Abstracts of Japan, vol. 13, No. 134, C–581, Abstract of JP, A, 63–297255, Dec. 5, 1988.

Patent Abstracts of Japan, vol. 14, No. 261, C–725, Abstract of Japan, A, 2–74547, Mar. 14, 1990.

Primary Examiner—Anthony Green
Attorney, Agent, or Firm—Robert S. Honor; Carl W. Battle; Carol A. Loeschorn

[57] ABSTRACT

A process for modifying the slump of a concrete or mortar by the addition at different times of a water-soluble poly-(alkylene oxide) and a β-naphthalene sulphonate-formaldehyde condensate, a plasticizer or superplasticizer which is selected from lignosulphonates, melamine sulphonate formaldehyde condensates, carboxylates and selected styrene-maleic anhydride copolymers. The poly(alkylene oxide) is preferably partially replaced by a (hydroxy)alkyl cellulose. The process is advantageously used in shotcreting.

6 Claims, No Drawings

WORKABLE CEMENTITIOUS COMPOSITIONS

This invention relates to cementitious compositions and more particularly to cementitious compositions having enhanced slump characteristics.

The oldest and most widely-used assessment of the workability of cementitious compositions such concretes or mortars is the slump test, defined in ASTM C143. A frustoconical mould of cementitious composition is moulded on a table and the mould then removed, the slump being the difference in height from the table between the top of the original mound and the level to which it falls. The bigger the slump, the better the workability.

Achieving sufficient slump for a sufficiently long period can prove difficult under some conditions, and it can happen that a cementitious composition loses slump too quickly and sets up before the composition is in place, with unfortunate consequences. The art-recognized plasticizers and superplasticizers cannot rectify this problem.

It has now been found that it is possible to maintain slump of a cementitious composition for a considerable period by the addition thereto of certain materials. There is therefore provided, according to the present invention, a method of achieving sustained workability of a cementitious composition, comprising the addition thereto of a water-soluble poly(alkylene oxide) of molecular weight from 100,000–8,000,000 and a plasticizer or superplasticizer selected from the group consisting of lignosulphonates, melamine sulphonate formaldehyde condensates, polycarboxylates and styrene-maleic anhydride-based copolymers (hereinafter SMA copolymers) in free acid or salt form selected from the group consisting of (a) those having the following types and numbers of monomer units:

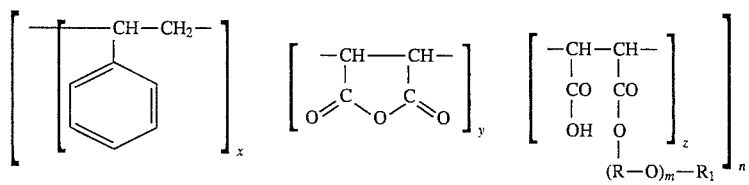

in which

R is an $C_{2-6}$alkylene radical $R_1$ is a $C_{1-20}$alkyl-, $C_{6-9}$cycloalkyl- or phenyl group, x, y and z are numbers from 0.01 to 100 m is a number from 1 to 100 and n is a number from 10 to 100 with the provisos, that i) the ratio of x to (y+z) if from 1:10 to 10:1 inclusive, ii) the ratio of z:y is from 3:1 to 100:1 and iii) m+n=15–100 and (b) those having the following types and numbers of monomer units:

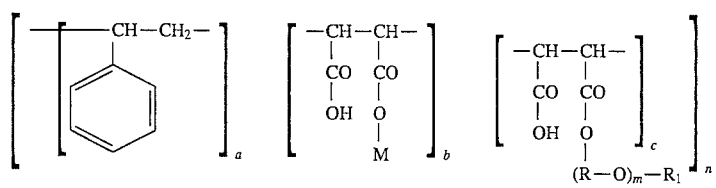

in which

M is hydrogen or the residue of a hydrophobic polyalkylene glycol or polysiloxane, R, $R_1$, m and n are as hereinabove defined, a, b and c are numbers from 1 to 100 with the proviso that i) the ratio of a to (b+c) if from 1:10 to 10:1 inclusive, ii) the ratio of c:b is from 5:1 to 100:1 and iii) m+n=15–100

The invention further provides an admixture for use in the cementitious composition, comprising a mixture of a polyalkylene oxide as hereinabove defined and a plasticizer or a superplasticizer as hereinabove defined.

The invention further provides a concrete or mortar mixture whose slump characteristics have been altered by the addition thereto of a poly(alkylene oxide) and a plasticizer or superplasticizer as hereinabove defined.

It is often very important, not only that a given concrete or mortar mixture has an adequate slump when it is being transported or worked, but also that this slump be readily reduced. The best example of this occurs with sprayed concrete, sometimes known as "shotcrete". Here, a concrete is required to be pumpable (a condition which requires considerable slump), but when it is sprayed on to a substrate, it is required to become stiff very quickly (a condition which allows nearly no slump). There are naturally many other uses where it would be very convenient to change completely the slump characteristics of a concrete. However, hitherto, drastic changes of slump have only been possible by adding accelerators or otherwise influencing the reaction between the admixture and the cement.

It has now been found that a particular embodiment of this invention makes it possible to change completely the slump characteristics of a cementitious composition from high to low by a relatively simple operation without influencing the setting of the cement. The present invention therefore further provides a process for modifying the slump of a cement mix, comprising the addition to the mix of a water-soluble poly(alkylene oxide) as hereinabove defined, a plasticizer or superplasticizer as hereinabove defined, and a β-naphthalene sulphonate-formaldehyde condensate ("BNS"), the poly(alkylene oxide) and the BNS being added separately, one of them being added prior to end-use of the cementitious composition.

The invention further provides the use of BNS in conjunction with a water-soluble poly(alkylene oxide) as hereinabove defined with at least one plasticizer or superplasticizer selected from lignosulphonates, melamine sulphonate-formaldehyde condensates, polycarboxylates and SMA copolymers, as an additive to a concrete or mortar mix to reduce the slump thereof.

The invention further provides a product adapted to reduce slump in a concrete or mortar mix, comprising poly(alkylene oxide), BNS and plasticizer or superplasticizer as hereinabove defined, together with instructions for their use.

The poly(alkylene oxide) suitable for use in this invention may be selected from any such suitable materials known to the art. The requirement that the material be water-soluble means that the material must include at least a high proportion of oxyethylene units. It is preferable that the materials be pure poly(ethylene oxide). It is also preferable that the molecular weight fie in the range 2,000,000–5,000,000. Typical commercial products useful in the working of this invention may be found, for example, in the "Polyox" (trade mark) range of Union Carbide Chemicals and Plastics Company, Inc.

In an especially preferred embodiment of the invention, the poly(alkylene oxide) is partially replaced by an alkyl or hydroxyalkyl cellulose.

The alkyl or hydroxyalkyl cellulose for use in this invention may be any (hydroxy)alkyl celluloses known to the art. A number of such materials, for example methyl, ethyl and hydroxyethyl celluloses, are commercially-available materials. Hydroxyethyl cellulose is the preferred material.

It is essential that there be used in conjunction with the poly(alkylene oxide) at least one plasticizer or superplasticizer selected from lignosulphonates, melamine sulphonate-formaldehyde condensates, polycarboxylates and SMA. A plasticizer or superplasticizer is a material which has the facility of reducing the water content of a cementitious mixture considerably (sometimes by as much as 30%). They are described, for example, in "Concrete Admixtures Handbook" (ed. Ramachandran, Noyes 1984) or "Concrete" (Mindess & Young, Prentice-Hall 1981), the contents of which are incorporated herein by reference. Details of art-recognized superplasticizers are given, for example in Ramachandran at pp. 211–213.

Details of the SMA copolymers, which, for the purposes of this invention, are the preferred (super)plasticizers, are to be found in European Published Application 0 306 449 and German Offenlegungsschrift (published application) 41 42 388, the contents of which are incorporated by reference.

The BNS for use in this invention is a readily-available material, widely used as a superplasticizer in the concrete industry. It is an unusual feature of this invention that the BNS does not act in this manner in the composition of the invention. It can be used as a powder but it is preferred that there be used an aqueous solution containing approximately 40% of active substance in the form of the sodium salt.

The combination of BNS with poly(alkylene oxide) and, where present, (hydroxy)alkyl cellulose and plasticizers or superplasticizers, added sequentially as hereinunder described, has the unique ability to confer on cementitious compositions long-lasting flow (high slump) followed immediately by a rapid stiffening (low slump). Conventional plasticizers or super-plasticizers such as melamine sulphonate-formaldehyde condensates have a good plasticising effect when used alone, but this is lost after a short period and slump goes from high to low.

The mode of use of the invention is that one of the poly(alkylene oxide) and BNS is mixed into the cementitious composition mix at a suitable stage ("the first addition") and the final substance is added and mixed in prior to end-use ("the final addition"). Precisely when this final addition is made depends very much on the nature of the mix and the requirements of the job but this can readily be ascertained by the skilled person. Thus, if the concrete is to be poured from a conventional mixer, the second substance is added and mixed in just before the pour. In the case of concrete or mortar spraying, the second substance is injected into the spray nozzle.

The substances can be added to the concrete mix in any order, that is, the poly(alkylene oxide) and, where present, (hydroxy)alkyl cellulose may be incorporated into the mix and the BNS added to the mix just before end-use, or vice versa. The former possibility is preferred. The plasticizers or superplasticizers may be added at any time, but it is preferred to add them at the same time as the poly(alkylene oxide), preferably mixed with the poly(alkylene oxide).

It is additionally preferred that the poly(alkylene oxide) and the plasticizer or superplasticizer be added first, with the BNS being added later. This has the advantage of giving the maximum slump for the longest time.

It is a particular feature of the invention that the use of a combination of poly(alkylene oxide) (optionally with (hydroxy)alkyl cellulose)+superplasticizers with BNS in the manner hereinabove described gives a relatively long period of high slump followed by a rapid onset of low slump. The reduction of slump at the moment of the final addition is so quick that for many purposes the usual addition of an accelerator becomes superfluous. Only in the case of shotcrete where fast strength development is necessary will a combination of BNS with an accelerator be added to the nozzle.

The relative quantities of the substances to be used in the working of this invention and their relation to the quantity of cementitious composition may vary over wide limits, depending largely on the composition of the mix, the use to which it is to be put, the method of application, the desired speed with which the slump properties are to change and the desired initial and final slumps. Other factors such as ambient temperature may have an effect on the proportions needed.

With only minor experimentation the skilled person can readily determine suitable proportions in any given case. As a general guideline quantities of 0.001 to 0.01% by weight of poly(alkylene oxide) and 0.1 to 1.5% by weight of the BNS (calculated as active substance), based on the weight of cement, will be used. When (hydroxy)alkyl cellulose is used, it may replace up to 50% by weight of the poly(alkylene oxide). The ratio of poly(alkylene oxide) and where present, (hydroxy)alkyl cellulose to BNS will be from 1:100 to 1:30.

The plasticizer or superplasticizer is added at a rate of 0.03 to 0.5% (calculated as active substance) by weight of the cement.

In a further preferred embodiment, the invention provides an additive for addition to a cement mix on batching, comprising a SMA copolymer as hereinabove described and a poly(ethylene oxide) of molecular weight from 2,000,000 to 5,000,000 in a ratio of from 30:1 to 4:1.

It is permissible to add any of the wide range of concrete admixtures to the mix (prior to the addition of the second substance prior to use). An admixture is, according to the definition in ASTM C125

"a material other than water, aggregates and hydraulic cement that is used as an ingredient of concrete or mortar and is added to the batch immediately before or during its mixing"

(See, for example; "Concrete" and "Concrete Admixtures Handbook", as mentioned hereinabove). Examples of such admixtures are retarders such as sodium phosphate and, particularly preferred, phosphonic acid derivatives, especially those available under the trade mark DEQUEST as decribed in, for example, European Published Application No. 0 324 501, the contents whereof are incorporated herein by reference.

As hereinabove indicated, the addition of accelerators will not always be necessary for rapid stiffening. In the case of shotcrete however, it is preferred to use known accelerators such as silicates (typically sodium silicate ("water glass")) and aluminates which are added in amounts of about 2–8% by weight, based on the cement weight. A further feature of the invention is, therefore, the combination of BNS with silicate and/or aluminate.

A preferred admixture in this connection is the combination of 8 parts of sodium silicate (30–45% solution), one part of the 40% aqueous solution of BNS and one further part of water.

The invention is generally applicable to all cementitious compositions, however constituted and however used, where a long period of workability and/or a relatively rapid transformation from an initial high slump to a final low slump are required. It is especially valuable in spraying concrete ("shotcrete"), e.g. for permanent final linings, including fiber shotcrete, where it gives less rebound, better orientation of any reinforcing fibers present and higher strength. It is, also applicable in sprayable thixotropic plastering mortar, in pourable repair mortar, in slipforming concrete and in road or paving concrete.

The invention is further described with reference to the following examples in which all parts are expressed by weight.

EXAMPLE 1

Spraying concrete for rock support (wet method)

A mixture consisting of 410 parts of cement, 25 parts of silica fume, 1480 parts of sand (0–8mm), 0.6% by weight (on cement) of stabilizer (phosphonic acid derivative), 2 parts of a combination of 20 parts of copolymer of styrene and maleic acid ester (as obtained in Example 1 of DE 4142388) with 1.5 parts of poly(ethylene oxide)-Polyox WSR 301 of Union Carbide-1 part of lignosulphonate and water to achieve a ratio of 0.5 (water/cement & silica fume) is made up and pumped in the usual manner through the hose to a nozzle where an activator combination consisting of 8 parts of sodium silicate (36% aqueous solution), 1 part of an aqueous solution (40%) of β-naphthalene sulphonate-formaldehyde condensate and 1 part of water is added (3% by weight of cement).

The initial slump of 25 cm can be kept unchanged over 1½ hours. Nevertheless, the mixture can be sprayed in the usual manner with a reduced rebound and a high early strength within 2 hours.

EXAMPLE 2

Spraying fiber concrete

A mixture consisting of 450 parts of cement, 36 parts of silica fume, 1400 parts of sand (0–8mm), 8 parts of the combination mentioned in Example 1, 50 parts of 40mm fibers and water to achieve a ratio of water to cement and silica fume of 0.41 (W/C+S) is made up and pumped in the usual manner. In the nozzle 4% by weight of cement of the activator combination mentioned in Example 1 is added.

The use of this mixture reduced the high fiber rebound and increased the toughness index $I_{30}$.

EXAMPLE 3

Repair mortar for handspraying

| Mix design: cement | 450 parts |
|---|---|
| silica fume | 25 parts (densified powder) |
| sand (Dmax 6 mm) | 1480 parts |
| lignosulphonate | 3 parts |
| stabilizer (phosphonic acid derivative) | 1 part |
| combination of Example 1 | 4 parts |
| Water/Cement + Silica fume | 0.45 |

The slump of 24 cm remained unchanged, when batching was continued during transport. Before spraying, 2% by weight of cement is added from the activator combination of Example 1.

EXAMPLE 4

| Spraying mortar on a bob track | |
|---|---|
| cement | 400 kg |
| silica fume | 10 kg |
| sand (0-8 mm) | 1670 kg |
| polymer additive (polyvinyl acetate powder) | 3% of cement weight (12.5 kg) |
| polypropylene fibers | 1 kg |
| 18 mm steel fibers | 60 kg |
| combination of Ex. 1 | 8 kg |
| stabilizer (phosphonic acid derivative) | 0.6% of cement weight (2.5 kg) |
| Water/Cement + Silica fume | 0.45 |

Add in nozzle activator of Ex. 1 (4% of Cement+Silica weight).

EXAMPLE 5

Shotcrete with a slump of 21 cm is prepared by mixing

| cement | 400 kg |
|---|---|
| silica fume | 30 kg |
| sand (0–8 mm) | 1700 kg |
| stabilizer (phosphonic acid derivative) | 2.8 kg |
| combination of Ex. 1 | 5 kg |
| Water/Cement + Silica fume | 0.5 |

A 40% solution of β-naphthalene sulphonate-formaldehyde condensate is added in the nozzle (1% of cement+silica fume weight).

7

The process enables spraying of thick layers on vertical substrate.

EXAMPLE 6

Plastering mortar containing

| | |
|---|---|
| cement | 200 kg/m³ |
| sand (0–4 mm) | 1800 kg/m³ |
| combination of Ex. 1 | 2 kg/m³ |
| Water/Cement | 0.5 | has a good flowable consistency. When spraying, 1.5% of cement weight of the solution used in Example 5 is added in the spraying nozzle

EXAMPLE 7

A flowable grouting/repair mortar is made up by mixing

| | |
|---|---|
| cement | 45.4 parts |
| sand | 48.7 parts |
| calcium oxide | 3.2 parts |
| silica fume | 2.0 parts |
| BNS* powder | 0.6 parts |
| antifoam agent | 0.1 parts |
| Water/Cement + Silica fume | 0.5 | when spraying, 2% cement weight of a 1% solution of Polyox WSR 301 is added in the nozzle.

EXAMPLE 8

Example 1 is repeated, but with 0.75 parts of the polyethylene oxide used in that example being replaced by 0.75 parts of hydroxyethyl cellulose.

The slump performance of the resulting composition is similar to that of the composition of Example 1.

We claim:

1. A process of modifying the slump of a cement mix which is applied by spraying said cement mix onto a substrate from a spray nozzle, comprising the steps of adding a water-soluble poly(alkylene oxide) of molecular weight from 100,000–8,000,000 and a plasticizer or superplasticizer selected from the group consisting of lignosulphonates, melamine sulfonate-formaldehyde condensates, carboxylates and styrene-maleic anhydride-based copolymers in free acid or salt form, said styrene-maleic anhydride-based copolymer selected from

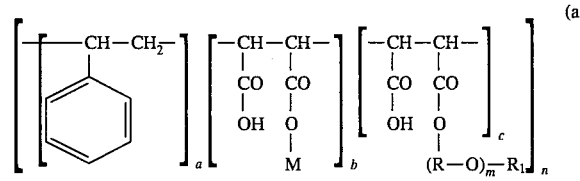

(a)

in which

8

R is an $C_{2-6}$ alkylene radical $R_1$ is a $C_{1-20}$ alkyl-, $C_{6-9}$ cycloalkyl- or phenyl group, x, y, and z are numbers from 0.01 to 100 m is a number from 1 to 100 and n is a number from 10 to 100 with the provisos that i) the ratio of x to (y+z) is from 1:10 and 10:1 inclusive, ii) the ratio of z:y is from 3:1 to 100:1 and iii) m+n=15–100 and

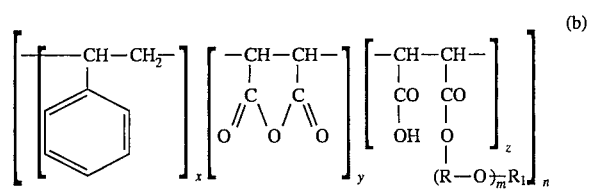

(b)

in which

M is hydrogen or the residue of a hydrophobic polyalkylene glycol or polysiloxane, R, $R_1$, m and n are as hereinabove defined, a, b, and c are numbers from 1 to 100 with the provisos that i) the ratio of a to (b+c) is from 1:10 to 10:1 inclusive, ii) the ratio of c:b is from 5:1 to 100:1 and iii) m+n=15–100 to the cement mix prior to the cement mix reaching the spray nozzle and injecting a β-naphthalene sulfonate-formaldehyde condensate into said cement mix at the spray nozzle optionally together with a conventional accelerator.

2. A process according to claim 1 wherein said β-naphthalene sulphonate-formaldehyde condensate is injected as a mixture said mixture comprising 80–95% by weight of a 30–45% silicate solution, 2.5–10% by weight of a 40% solution of β-naphthalene sulphonate-formaldehyde condensate and 2.5–10% by weight of water.

3. A process according to claim 1 in which the water-soluble poly(alkylene oxide) is partially replaced by a (hydroxy)alkyl cellulose.

4. A process according to claim 1 in which the plasticizer or superplasticizer is a styrene-maleic anhydride-based copolymer.

5. A process according to claim 1 in which the poly(alkylene oxide) is a poly(ethylene oxide) having a molecular weight of 1,000,000–5,000,000.

6. A process according to claim 4 in which the poly(alkylene oxide) has a molecular weight of 2,000,000–5,000,000 and the styrene-maleic anhydride-based copolymer and poly(alkylene oxide) are added in a weight ratio of 30:1 to 4:1.

* * * * *